United States Patent

Nagashima et al.

[11] Patent Number: 5,910,560
[45] Date of Patent: Jun. 8, 1999

[54] THERMOPLASTIC RESIN COMPOSITION AND MOLDED ARTICLE

[75] Inventors: Tohru Nagashima; Hiroshi Nakamura, both of Ibaraki; Hideo Nomura, Chiba; Mituo Maeda, Ibaraki, all of Japan

[73] Assignee: Sumitomo Chemical Company, Ltd., Osaka, Japan

[21] Appl. No.: 08/979,560

[22] Filed: Nov. 26, 1997

[30] Foreign Application Priority Data

Nov. 29, 1996 [JP] Japan .................................... 8-320476
Apr. 11, 1997 [JP] Japan .................................... 9-093666
Sep. 19, 1997 [JP] Japan .................................... 9-254621

[51] Int. Cl.$^6$ ................................................. C08G 64/00
[52] U.S. Cl. ........................... 528/196; 525/192; 525/212; 528/212
[58] Field of Search ................................... 528/196, 198; 525/192, 212

[56] References Cited

FOREIGN PATENT DOCUMENTS

| | | |
|---|---|---|
| 0000732A1 | 2/1979 | European Pat. Off. . |
| 0000733A1 | 2/1979 | European Pat. Off. . |
| 0127852A1 | 12/1984 | European Pat. Off. . |
| 0133907A1 | 3/1985 | European Pat. Off. . |
| 0186927A2 | 7/1986 | European Pat. Off. . |
| 45-39181 | 12/1970 | Japan . |
| 49-13855 | 4/1974 | Japan . |
| 54-28361 | 3/1979 | Japan . |
| 60-5108 | 1/1985 | Japan . |
| 60-51739 | 3/1985 | Japan . |

*Primary Examiner*—Terressa Mosley
*Attorney, Agent, or Firm*—Birch, Stewart, Kolasch & Birch, LLP

[57] ABSTRACT

A thermoplastic resin composition comprising an aromatic polycarbonate resin and an aromatic polysulfone resin and having the specific melt viscosity ratio between the two resins in the composition. This composition is excellent in heat resistance and gives a molded article of especially high temperature of deflection under load.

11 Claims, No Drawings

THERMOPLASTIC RESIN COMPOSITION AND MOLDED ARTICLE

BACKGROUND OF THE INVENTION

1. Field of the Invention

The present invention relates to a thermoplastic resin composition which is excellent in mechanical properties, heat resistance and moldability, and a molded article thereof.

2. Description of the Related Art

For the purpose of improving the chemical resistance of an aromatic polycarbonate resin, and improving the impact resistance and the flowability during the mold processing of an aromatic polysulfone resin, various thermoplastic resin compositions comprising an aromatic polycarbonate resin and an aromatic polysulfone resin are disclosed.

For example, JP-B-45-39181 discloses that chemical resistance and thermal stress brittleness are improved compared with each resin by mixing an aromatic polysulfone resin and an aromatic polycarbonate resin.

JP-B-49-13855 discloses that a composition comprising an aromatic polysulfone resin and an aromatic polycarbonate resin is excellent in heat-deformation resistance compared with ABS resin.

JP-A-54-28361 discloses that a composition comprising an aromatic polycarbonate resin having a weight average molecular weight of larger than 60000 and an aromatic polysulfone resin, has a improved chemical resistance and good temperature of deflection under load compared with the respective resins.

Moreover, JP-A-60-51739 discloses that a composition comprising an aromatic polysulfone resin and an aromatic polycarbonate resin containing specific structures is excellent in a mechanical property, and improved in chemical resistance.

However, the above described compositions can not satisfy the physical properties in many cases, since an aromatic polycarbonate resin lowers the excellent physical properties, such as the heat resistance which is inherent in an aromatic polysulfone resin.

JP-A-60-5108 discloses a microwave oven container comprising an aromatic polysulfone resin. However, a container comprising an aromatic polysulfone resin alone has sometimes insufficient flowability during mold processing, and it is hard to obtain a molded article having a good appearance.

For a lamp reflector (referred to as "a reflecting mirror", sometimes), especially for a head lamp reflector and a fog lamp reflector of cars, a metallic material such as a sheet steel or a glass material has been conventionally used.

In recent years, various designs are demanded and a resin material having an excellent processing property and a high degree of freedom has been demanded. Under such a background, a bulk molding compound (BMC) in which an unsaturated polyester resin is reinforced with inorganic fillers, such as a glass fiber, came to be used as a material for the above use.

Further, as a lamp reflector material, a polycarbonate and a polyphenylene sulfide resin which are thermoplastic engineering plastics, have been examined for the purpose of improving a recycle property of the materials, performance, and a mold processing property. However, in the use of a halogen lamp with a high temperature of light source, or in the use of a projector type reflector from which a large quantity of light can be obtained, there may be a problem that the heat resistance is insufficient to generate heat deformations. In order to raise the forward visibility of a vehicle, a reflection property on the surface of a reflector is important, and the surface needs to be smooth. Therefore, an undercoat processing is made on the surface of a molded material and it is industrially disadvantageous.

SUMMARY OF THE INVENTION

A purpose of the present invention is to provide a thermoplastic resin composition which is excellent in heat resistance and which gives a molded article of especially high temperature of deflection under load.

Another purpose of the present invention is to provide a microwave oven parts having a high heat resistance, a high mechanical strength, and an outstanding appearance, and to provide a reflector for lamps.

According to the present invention, there is provided a composition comprising an aromatic polycarbonate resin and an aromatic polysulfone resin and having the specific melt viscosity ratio between the two resins in the composition.

That is, the present invention is as follows.

[1] A thermoplastic resin composition comprising 15 to 55% by weight of an aromatic polycarbonate resin, and 85 to 45% by weight of an aromatic polysulfone resin, wherein the ratio ($\eta a/\eta b$) of a melt viscosity ($\eta a$) of the aromatic polycarbonate resin to a melt viscosity ($\eta b$) of the aromatic polysulfone resin defined below is 0.5 to 2.0.

$\eta a$: Melt viscosity of the aromatic polycarbonate resin measured at a temperature of 340° C. and a shear rate of 1216/second.

$\eta b$: Melt viscosity of the aromatic polysulfone resin measured at a temperature of 340° C. and a shear rate of 1216/second.

[2] A thermoplastic resin composition comprising 100 parts by weight of the thermoplastic resin composition of [1], and 1 to 10 parts by weight of titanium oxide having a number average particle diameter of 0.01 to 5 $\mu$m.

[3] A thermoplastic resin composition comprising 100 parts by weight of the thermoplastic resin compositions of [1], and 1 to 80 parts by weight of a filler selected from the group consisting of clay, kaolin and talc.

[4] The thermoplastic resin composition described in [1], [2] or [3], wherein the ratio ($\eta a/\eta b$) is 0.8 to 1.8.

[5] The thermoplastic resin composition described in [1], [2] or [3], wherein the aromatic polycarbonate resin is a co-polycarbonate or a homo-polycarbonate containing at least 30 mol % of bisphenol A unit.

[6] The thermoplastic resin composition described in [1], [2] or [3], characterized by that the aromatic polysulfone resin has the repeating unit represented by the following formula in an amount of not less than 80 mol %.

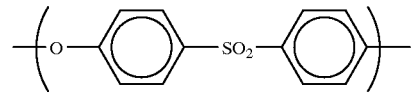

[7] A molded article using the thermoplastic resin composition of [1], [2] or [3].

[8] Microwave oven parts molded by using the thermoplastic resin composition of [1] or [2]

[9] The microwave oven parts described in [8], wherein the parts are a saucer or a container for food cooking used in a microwave oven.

[10] A lamp reflector comprising the thermoplastic resin composition of [1] or [3].

[11] The lamp reflector described in [10], wherein the lamp reflector is a head lamp for cars, a reflector for fog lamps, or a sub-reflector for head lamps.

DETAILED DESCRIPTION OF THE INVENTION

The aromatic polycarbonate resins used in the present invention are homopolymers, copolymers and mixtures thereof containing a repeating unit represented by the general formula below.

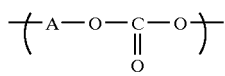

In the formula, A is a divalent aromatic group which is residue of a dihydric phenol of a raw material. Dihydric phenol which can be used in order to produce such an aromatic polycarbonate is a single- or plural-nucleus aromatic compound containing two hydroxyl groups as functional groups which bond directly to aromatic carbon atoms.

Examples of the dihydric phenol include 2,2-bis(4-hydroxy phenyl)propane(bisphenol A), bis(4-hydroxy phenyl)methane, 2,2-bis(4-hydroxy-3-methylphenyl)propane, 2,2-(3,5,3',5'-tetrachloro-4,4'-hydroxy phenyl)propane, 2,2-( 3,5,3',5'-tetrabromo-4,4'-hydroxy phenyl)propane, 1,1-bis(4-hydroxy phenyl)cyclohexane, hydroquinone, resorcinol, dihydroxy diphenyl, etc., without being limited thereto. The aromatic polycarbonate resin is preferably a co-polycarbonate having more than 30 mol % of bisphenol A unit or a homo-polycarbonate. The terminal structure is determined according to the preparation process, and for example, OH and OC(CH3)3 are included, without being limited thereto.

As for the melt viscosity of the aromatic polycarbonate resin used in the present invention, measured at 340° C. and a shear rate of 1216/second, it is preferably 2000–10000 poise, and more preferably 2000–6000 poise. When the melt viscosity exceeds 10000 poise, the melt viscosity of a composition becomes high to make the mold processing difficult, it is not preferable.

The aromatic polysulfone resin used in the present invention comprises an arylene unit, an ether bond and a sulfone bond as indispensable components. The arylene unit is defined as a polyarylene compound located disorderly or orderly together with an ether bond and a sulfone bond. The following repeating units are included as the typical examples, without being limited thereto.

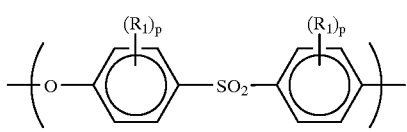

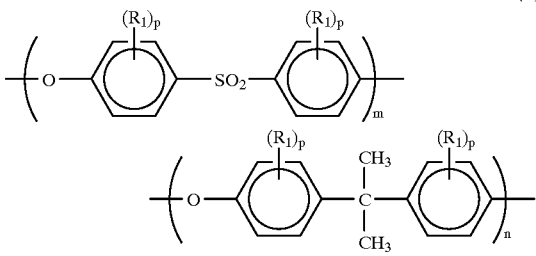

The compound (II) contains a random copolymer. In the formula, $R_1$ represents an alkyl group having 1–6 carbon atoms, an alkenyl group having 3–10 carbon atoms, a phenyl group, or a halogen atom; p is an integer of 0 to 4; m and n represent average number of repeating units, and m and n are within the range of 0.1 to 100; each $R_1$ on the same or different nucleus may differ mutually; p may differ each mutually.

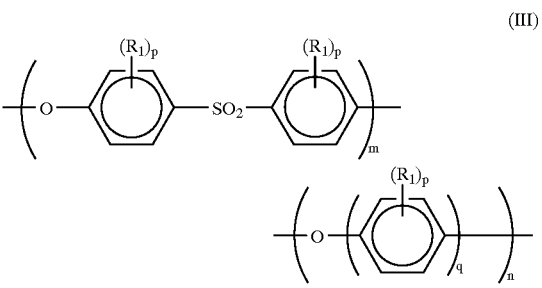

This compound contains a random copolymer. In the formula, $R_1$ represents an alkyl group having 1–6 carbon atoms, an alkenyl group having 3–10 carbon atoms, a phenyl group, or a halogen atom; p is an integer of 0 to 4; q, m and n represent average number of repeating units, q is a numeral of 1 to 3, m and n are within the range of 0.1 to 100; each $R_1$ on the same or different nucleus may differ mutually; p may differ each mutually.

As for the aromatic polysulfone resin used in the present invention, the value of (m/m+n) in the repeating unit represented by (II) or (III) is preferably not less than 0.8. Moreover, q in the structural unit of (III) is preferably 1. Among them, a polysulfone having the repeating units of (I) and (II) is preferable, and a polysulfone having the repeating unit of (I) is more preferable. As examples of a commercial product, SUMIKAEXCEL PES 3600P and 4100P (tradename; manufactured by Sumitomo Chemical Co.,Ltd.) are exemplified as for (I) and UDEL P-1700 (tradename; manufactured by AMOCO company) is exemplified as for (II), without being limited thereto.

The terminal structure is determined according to the preparation process of each resin, and Cl, OH, OR (R is an alkyl group), etc. are exemplified without being limited thereto.

As for the melt viscosity of the aromatic polysulfone resin used in the present invention measured at 340° C. and a shear rate of 1216/second, it is preferably 1000–6000 poise, and more preferably 1000–3000 poise. When melt viscosity exceeds 6000 poise, the melt viscosity of a composition is high and the mold processing becomes difficult, it is not preferable.

The ratio (ηa/ηb) of the melt viscosity of an aromatic polycarbonate resin (a) to an aromatic polysulfone resin (b)

used in the present invention measured at 340° C. and a shear rate of 1216/second are 0.5–2.0. It is preferably 0.8–1.8, and more preferably 1.0–1.6. When ηa/ηb is smaller than 0.5, the heat resistance of the composition is inferior and it is not preferable.

The amount of an aromatic polycarbonate resin contained in a resin composition of the present invention is 15–55% by weight on the basis of the total weight of an aromatic polysulfone resin and the aromatic polycarbonate resin. It is preferably 25–45% by weight. If the amount of aromatic polycarbonate resin is more than 55% by weight, the heat resistance of a composition is inferior, and it is not preferable.

Titanium oxide used in the present invention will not be limited as long as the main component of it is an oxide of titanium, but the compound containing titanium dioxide as a main component is preferable. The crystal form of the titanium oxide is not especially limited, namely, a rutile type, an anatase type and a brookite type are exemplified. Among them, especially a rutile type is preferable.

Although the preparation process of titanium oxide is not especially limited. There can be exemplified the sulfuric acid method in which an ilmenite as a raw material is treated with sulfuric acid, and the chlorine method in which a rutile as a raw material is treated by chlorine gas.

Titanium oxide whose surface is treated with 1 or more metallic compounds selected from aluminium, silicon, zirconia, zinc and manganese, has a good affinity with the aromatic polysulfone resin and the aromatic polycarbonate resin used in the present invention. Since it gives an excellent appearance to a molded article, it is especially preferable. The method of the surface treatment of titanium oxide is not especially limited. On the surface of titanium oxide, compounds can be deposited after steps such as neutralization and drying, from the aqueous solution of the hydroxide of each metal or the composite oxide like sodium aluminate, composite hydroxide, or its hydrate etc.

The form of a titanium oxide particle is not especially limited in the present invention. Spherical titanium oxide having a number average particle diameter of 0.01–5 μm is preferable. Spherical titanium oxide having a number average particle diameter of 0.02–1 μm is more preferable. If the particle diameter of titanium oxide is larger than 5 μm, a screw of a granulating machine and a die of a molding machine are abraded by the hardness of titanium oxide, and it is not preferable.

If the particle diameter of the surface-treated titanium oxide is smaller than 0.01 μm, a strand becomes easy to be cut during granulation, and a stable granulation becomes impossible, and it is not preferable. The number average particle diameter here is calculated on the basis of the accumulation particle size distribution measured by laser scattering method. As an example of a measurement device, MASTERSIZER (manufactured by Malvern Instruments Ltd) is mentioned.

In the present invention, the amount of titanium oxide added to 100 parts by weight of a thermoplastic resin composition is 0.5 to 20 parts by weight, and preferably, it is 1 to 10 parts by weight. If the amount of titanium oxide is more than 20 parts by weight, the biting property into screw becomes bad, the plasticization during mold processing becomes unstable, and it is not preferable.

The thermoplastic resin composition of the present invention is used for microwave oven parts. Microwave oven parts mean parts, such as a saucer and a container for cooking on the saucer used in a microwave oven, an axial receptacle, and a rotation gear. The resin composition used in the present invention is suitable especially for a saucer or a container for food cooking used in an microwave oven.

Clay used in the present invention is pyrophyllite as fine powder. Generally, pyrophyllite clay is used. Pyrophyllite clay has a composition represented by $Al_2Si_4O_{10}(OH)_2$, and has a shape of irregular hexagonal or leaflet. In the present invention, from the viewpoint of processability and a surface property, clay having a weight average particle diameter of 20 micrometers or less is preferable.

Kaolin used for the present invention is powder having a composition represented by $Al_2Si_2O_5(OH)_4$. There are three types of kaolins, namely, kaolinite, dickite, and nacrite, and either of them can be used. In the present invention, from the viewpoint of processability and a surface property, kaolin having a weight average particle diameter of 20 micrometers or less is preferable.

Talc used for the present invention is white fine powder of a composition represented by $Mg_3(Si_4O_{10})(OH)_2$ having a layer structure, and generally it is used as a lubricant. In the present invention, from the viewpoint of processability or a surface property, talc having a weight average particle diameter of 20 micrometers or less is preferable.

In the present invention, when clay, kaolin or talc is added, the amount of clay, kaolin or talc to 100 parts by weight of thermoplastic resin compositions is 0.5–200 parts by weight, preferably 1–80 parts by weight. If the amount of clay, kaolin or talc is more than 200 parts by weight, feeding property to the screw becomes bad during granulation and the mechanical strength falls remarkably and it is not preferable.

The thermoplastic resin composition of the present invention is used for a lamp reflector. Especially, a thermoplastic resin composition containing clay, kaolin or talc has a high heat resistance, mechanical strength, and surface smoothness, and it is preferable. As a lamp reflector, a head lamp for cars, a reflector for fog lamps, or a sub-reflector for head lamps is mentioned. A lamp reflector of the present invention can be produced by a well-known method, and following preparation steps are exemplified.

(1) A lamp reflector of a needed design is molded by injection molding. To improve surface smoothness, an undercoat material is coated and cured. In the present invention, since the surface smoothness of a molded article is high, this process may be omissible.

(2) Aluminum is deposited on the molded article surface. The thickness of deposited aluminum is usually several micrometers.

(3) Top coating is applied.

In the present invention, if necessary, one or more of usual additives described below can be added.

Fibrous or needlelike reinforcements such as glass fiber silica alumina fiber, alumina fiber, carbon fiber, aluminum borate whisker, etc.; inorganic fillers, such as talc, mica, clay, glass bead, etc.; mold release agents, such as a fluoropolymer, metallic soaps, etc.; colorants, such as dye, pigment, etc.; antioxidant, heat stabilizer, ultraviolet absorber, antistatic agent, and a surfactant.

Moreover, a small amount of thermoplastic resin, for example, polyethylene, polypropylene, polyvinyl chloride, ABS resin, polystyrene, methacrylic resin, polyamide, polyester, polyphenylene sulfide, polyetherketone, polyphenylene ether and a modifications thereof, polyether imide, etc., alone or in combination of two or more may be added. Also, a small amount of thermosetting resin, for example, phenol resin, epoxy resin, cyanate resin, isocyanate resin, polyimide resin, etc. alone or in combination of two or more may be added. A small amount of rubber component can also be added. The formulation method of the raw material for obtaining a resin composition of the present invention is not especially limited.

Usually, an aromatic polycarbonate resin, an aromatic polysulfone resin, if necessary, reinforcements, such as glass fiber, an inorganic filler, a mold release agent and a heat stabilizer, etc. are mixed by using a Henschel mixer or a tumbling mixer etc., and melt-kneaded using an extruder. As a method of melt-kneading, it is possible that all raw materials are mixed together and fed to an extruder. It is also possible that raw materials such as an inorganic filler and reinforcements like glass fiber etc., can be fed separately from raw materials mainly composed of resins.

The preparation method of a molded article molded by using the thermoplastic resin composition of the present invention is not especially limited. As methods for melting, solidifying and shaping resins, an extrusion molding, injection molding, a blow molding, etc. are mentioned. Among them, especially injection molding is used preferably. Further, the extrusion-molded article may be processed by cutting or pressing.

The thermoplastic resin composition of the present invention can be used suitably for parts for a car, an airplane, etc., industrial instruments, household electric appliances products, tablewares and medical instruments, OA/AV instruments, and electron/electronic parts, for example, IC trays, IC sockets, etc. for which especially heat resistance is needed.

EXAMPLES

The present invention will be illustrated by the following examples, which do not limit the scope of the present invention in any way.

(1) Melt viscosity:

Melt viscosity of an aromatic polycarbonate resin and an aromatic polysulfone resin used for the thermoplastic resin composition of the present invention, is measured at a temperature of 340° C., and a shear rate of 1216/second through an orifice having a diameter of 1 mm, length of 10 mm, by using TOYOSEIKI SEISAKUSHO Ltd. CAPIROGRAPH 1B.

(2) Temperature of deflection under load (TDUL):

A test piece (length of 127 mm, width of 12.7 mm and thickness of 6.4 mm) is molded from a thermoplastic resin composition, using an injection molding machine, and measured according to ASTM D648, at the load of 18.6 kg/cm$^2$.

(3) Tensile strength:

ASTM dumbbell of No. 4 is molded from a thermoplastic resin composition by using an injection molding machine, and measured according to ASTM D638.

(4) Flexural modulus:

A test piece (length of 127 mm, width of 12.7 mm and thickness of 6.4 mm) is molded from a thermoplastic resin composition, using an injection molding machine, and measured according to ASTM D790.

(5) Izod impact strength:

A test piece for flexural modulus measurement (length of 127 mm, width of 12.7 mm, thickness of 6.4 mm) is molded and divided into two pieces in equal size for Izod impact strength measurement.

According to ASTM D-256, Izod impact strength is measured.

(6) Heat resistant test in a microwave oven

A square shape container (length of 147 mm, width of 103 mm, height of 30 mm, and thickness of 1.5 mm) is molded. 50 g of salad oil (manufactured by The Nisshin Oil Mills, Ltd.) is put into the container.

After irradiating the container for 10 minutes in a microwave oven(manufactured by Sharp Corporation, RE-HU0 type, output 65 W), deformation of the container is evaluated as below.

"Deformation"; the bottom plane deformation in height is not less than 5 mm.

"Slight Deformation"; although the bottom plane deformation in height is less than 5 mm, shakiness has generated.

(7) Surface smoothness

Using a mold having a mirrorlike surface, a test piece (length of 64 mm, width of 64 mm and thickness of 1 mm) is molded, and evaluated visually.

(8) Lamp lighting test

An article for lamp reflector (width of 150 mm, height 100, depth of 50 mm, and thickness of 1.5 mm in the front side) is molded by injection molding. Aluminum deposition is applied to the article according to the above-described steps. The lamp reflector is equipped with a halogen lamp of 12 V/55 W, and after 240 hours lighting, the deformation degree is observed visually.

Examples 1–3, Comparative Examples 1–3

An aromatic polycarbonate resin (tradename CALIBRE, manufactured by Sumitomo Dow Limited), and an aromatic polysulfone resin (tradename SUMIKAEXCEL PES, manufactured by Sumitomo Chemical Co., Ltd.) were mixed in a Henschel mixer as shown in Table 1, and pelletized at a cylinder temperature of 340° C. using a twin-screw extruder (PCM-30, manufactured by Ikegai Iron Works, Ltd.), and a thermoplastic resin composition was obtained.

A test piece was molded from this thermoplastic resin composition by using an injection molding machine (PS40E5 ASE, manufactured by Nissei Plastic Industrial Co., Ltd.) at a cylinder temperature of 350° C., and a mold temperature of 120° C. The evaluation result is shown in Table 1.

TABLE 1

| | Composition | | | | |
|---|---|---|---|---|---|
| | Aromatic polycarbonate resin | | Aromatic polysulfone resin | | |
| | (wt %) | η a (poise) | (wt %) | η b (poise) | η a/η b |
| Example 1 | 30 | 3500 | 70 | 2200 | 1.6 |
| Example 2 | 40 | 3500 | 60 | 2200 | 1.6 |
| Example 3 | 30 | 1400 | 70 | 2200 | 0.6 |
| Comparative Example 1 | 40 | 3500 | 60 | 8200 | 0.4 |
| Comparative Example 2 | 30 | 1400 | 70 | 5300 | 0.3 |
| Comparative Example 3 | 40 | 1400 | 60 | 5300 | 0.3 |

| | TDUL (° C.) | Tensile Strength (kg/cm$^2$) | Flexural Modulus (kg/cm$^2$) |
|---|---|---|---|
| Example 1 | 193 | 780 | 25800 |
| Example 2 | 186 | 760 | 25300 |
| Example 3 | 191 | 800 | 26400 |
| Comparative Example 1 | 156 | — | — |
| Comparative Example 2 | 170 | — | — |

TABLE 1-continued

| | | | |
|---|---|---|---|
| Comparative Example 3 | 153 | — | — |

Examples 4–8, Comparative Example 4

Aromatic polycarbonate resins (tradename CALIBRE, manufactured by Sumitomo Dow Limited) having different melt viscosity, aromatic polysulfone resins (tradename SUMIKAEXCEL PES, manufactured by Sumitomo Chemical Co., Ltd.) and a carbon fiber (tradename BESFIGHT HTA-C6-CS, manufactured by Toho Rayon Co., Ltd.) were mixed as shown in Table 2 by a Henschel mixer, pelletized by using a twin-screwextruder (PCM-30, manufactured by Ikegai Iron Works, Ltd.) at a cylinder temperature of 340° C., and thermoplastic resin compositions were obtained.

Test pieces were molded from the thermoplastic resin compositions by using an injection molding machine (PS40E5 ASE, manufactured by Nissei Plastic Industrial Co., Ltd.) at a cylinder temperature of 350° C., and a mold temperature of 120° C. The evaluation result is shown in Table 2.

TABLE 2

| | Composition | | | | | |
|---|---|---|---|---|---|---|
| | Aromatic polycarbonate resin | | Aromatic polysulfone resin | | Carbon fiber | |
| | (wt %) | $\eta$ a (poise) | (wt %) | $\eta$ b (poise) | (parts by weight) | $\eta$ a/$\eta$ b |
| Example 4 | 30 | 3500 | 70 | 2200 | 18 | 1.6 |
| Example 5 | 30 | 3500 | 70 | 3700 | 18 | 0.9 |
| Example 6 | 40 | 3500 | 60 | 2200 | 18 | 1.6 |
| Example 7 | 40 | 3500 | 60 | 3700 | 18 | 0.9 |
| Example 8 | 40 | 3500 | 60 | 5300 | 18 | 0.7 |
| Comparative Example 4 | 60 | 3500 | 40 | 2200 | 18 | 1.6 |

| | TDUL (° C.) | Tensile Strength (kg/cm$^2$) | Flexural Modulus (kg/cm$^2$) |
|---|---|---|---|
| Example 4 | 213 | 1420 | 104500 |
| Example 5 | 216 | — | — |
| Example 6 | 211 | 1450 | 96100 |
| Example 7 | 211 | — | — |
| Example 8 | 187 | — | — |
| Comparative Example 4 | 152 | 1410 | 96300 |

Examples 9–11, Comparative Example 5

Aromatic polycarbonate resins (tradename CALIBRE, manufactured by Sumitomo Dow Limited) having a different melt viscosity, aromatic polysulfone resins (tradename SUMIKAEXCEL PES, manufactured by Sumitomo Chemical Co., Ltd.) and a glass fiber (tradename CS03JAPx-1, manufactured by Asahi Fiber Glass Co., Ltd.) were mixed as shown in Table 3 by a Henschel mixer, pelletized by using a twin-screw extruder (PCM-30, manufactured by Ikegai Iron Works, Ltd.) at a cylinder temperature of 340° C., and thermoplastic resin compositions were obtained.

Test pieces were molded from the thermoplastic resin compositions by using an injection molding machine (PS40E5 ASE, Nissei Plastic Industrial Co., Ltd.) at a cylinder temperature of 350° C., and a mold temperature of 120° C. The evaluation result is shown in Table 3.

TABLE 3

| | Composition | | | | | |
|---|---|---|---|---|---|---|
| | Aromatic polycarbonate resin | | Aromatic polysulfone resin | | Glass fiber | |
| | (wt %) | $\eta$ a (poise) | (wt %) | $\eta$ b (poise) | (parts by weight) | $\eta$ a/$\eta$ b |
| Example 9 | 40 | 3500 | 60 | 2200 | 43 | 1.6 |
| Example 10 | 30 | 3500 | 70 | 2200 | 43 | 1.6 |
| Example 11 | 30 | 3500 | 70 | 3700 | 43 | 0.9 |
| Comparative Example 5 | 40 | 1400 | 60 | 5300 | 43 | 0.3 |

| | TDUL (° C.) | Tensile Strength (kg/cm$^2$) | Flexural Modulus (kg/cm$^2$) |
|---|---|---|---|
| Example 9 | 211 | 1470 | 94600 |
| Example 10 | 207 | 1220 | 86200 |
| Example 11 | 209 | 1340 | 85500 |
| Comparative Example 5 | 156 | 1380 | 89000 |

Examples 12–18, Comparative Examples 6 and 7

An aromatic polycarbonate resin (tradename CALIBRE, manufactured by Sumitomo Dow Limited), an aromatic polysulfone resin (tradename SUMIKAEXCEL PES, manufactured by Sumitomo Chemical Co., Ltd.) and if necessary titan oxide (CR-60; average particle diameter of 0.2 $\mu$m, manufactured by Ishihara Sangyo Kaisha, Ltd.) were mixed in a Henschel mixer as shown in Table 4, and pelletized at a cylinder temperature of 340° C. using a twin-screw extruder (PCM-30, manufactured by Ikegai Iron Works, Ltd.), and a thermoplastic resin composition was obtained.

A test piece was molded from the thermoplastic resin composition by using an injection molding machine (PS40E5 ASE, manufactured by Nissei Plastic Industrial Co., Ltd.) at a cylinder temperature of 350° C., and a mold temperature of 120° C. The evaluation result is shown in Table 4.

TABLE 4

| | Composition | | | | | |
|---|---|---|---|---|---|---|
| | Aromatic polycarbonate resin | | Aromatic polysulfone resin | | Titanium oxide | |
| | (wt %) | $\eta$ a (poise) | (wt %) | $\eta$ b (poise) | (parts by weight) | $\eta$ a/$\eta$ b |
| Example 12 | 30 | 3500 | 70 | 2200 | 0 | 1.6 |
| Example 13 | 40 | 3500 | 60 | 2200 | 0 | 1.6 |
| Example 14 | 40 | 3500 | 60 | 2200 | 2 | 1.6 |
| Example 15 | 40 | 3500 | 60 | 2200 | 5 | 1.6 |
| Example 16 | 30 | 3500 | 70 | 3700 | 2 | 0.9 |
| Example 17 | 40 | 3500 | 60 | 3700 | 2 | 0.9 |
| Example 18 | 30 | 3500 | 70 | 5300 | 2 | 0.7 |
| Comparative Example 6 | 60 | 3500 | 40 | 2200 | 2 | 1.6 |
| Comparative Example 7 | 40 | 1400 | 60 | 3700 | 2 | 0.4 |

TABLE 4-continued

| | Tensile Strength (kg/cm²) | Flexural Modulus (kg/cm²) | Izod Impact strength | TDUL (° C.) | Heat resistance in microwave oven |
|---|---|---|---|---|---|
| Example 12 | 780 | 25700 | >160 | 191 | no deformation |
| Example 13 | 770 | 25100 | >160 | 190 | no deformation |
| Example 14 | 760 | 25400 | >160 | 192 | no deformation |
| Example 15 | 760 | 25300 | >160 | 192 | no deformation |
| Example 16 | 790 | 25700 | >160 | 186 | no deformation |
| Example 17 | 760 | 25100 | >160 | 185 | no deformation |
| Example 18 | 800 | 25800 | >160 | 182 | no deformation |
| Comparative Example 6 | 760 | 25000 | >160 | 153 | slight deformation |
| Comparative Example 7 | 770 | 26100 | >160 | 154 | slight deformation |

It is found that the containers molded from the composition (comparative examples 6 and 7) having a low temperature of deflection under load, had a slight deformation by the above-mentioned microwave oven test and it is inconvenient in practical use. Containers molded from the composition of examples 12–18 do not show neither deformation nor discoloration at all.

Comparative Examples 8 and 9

A microwave oven test was conducted using an aromatic poly sulfone resin in which n=m and p=0 in the structure of the above-mentioned formula(II), (comparative example 8). Moreover, a polyether imide resin (tradename ULTEM1000, manufactured by General Electric Company), an aromatic polycarbonate resin (tradename CALIBRE, melt viscosity is 3500 poises at 340° C. under a shear rate of 1216/second, manufactured by Sumitomo Dow Limited,) and titanium oxide powder (tradename CR-60, mean particle diameter is 0.2 micrometers, manufactured by Ishihara Sangyo Kaisha, Ltd.) were mixed in the weight ratio of 70:30:10, pelletized, molded as the same manner with Example 1, and the microwave oven test was conducted (comparative example 9).

As a result, the container molded from the composition of comparative examples 8 shows deformation and discoloration. The container molded from the composition of comparative example 9 shows a slight deformation and discoloration.

Examples 19–29, Comparative Examples 10 and 11

An aromatic polycarbonate resin (tradename CALIBRE, manufactured by Sumitomo Dow Limited), an aromatic polysulfone resin (tradename SUMIKAEXCEL PES, manufactured by Sumitomo Chemical Co., Ltd.) and if neccesary, SP clay (rate of powders having a diameter of 20 micrometers or less is 98%, manufactured by Shokozan Mining Co., Ltd.), CT kaolin (mean particle diameter of 1.6 micrometers, manufactured by Shokozan Mining Co., Ltd.), Micron white #5000S which is talc with a mean particle diameter of 2.75 micrometers (manufactured by Hayashi Kasei Co., Ltd.) and CR-60 (manufactured by Ishihara Sangyo Kaisha, Ltd.) which is the titanium oxide powder whose mean particle diameter is 0.2 micrometers, were mixed in a Henschel mixer as shown in Table 5, and pelletized at a cylinder temperature of 340° C. using a twin-screw extruder (PCM-30, made by Ikegai Iron Works, Ltd.), and thermoplastic resin compositions were obtained.

Test pieces were molded from the thermoplastic resin composition by using an injection molding machine (PS40E5 ASE, manufactured by Nissei Plastic Industrial Co., Ltd.) at a cylinder temperature of 350° C., and a mold temperature of 120° C. The evaluation results are shown in Tables 5 and 6.

TABLE 5

| | Composition | | | | | | |
|---|---|---|---|---|---|---|---|
| | Aromatic polycarbonate resin | | Aromatic polysulfone resin | | Filler | | |
| | (wt %) | η a (poise) | (wt %) | η b (poise) | | (parts by weight) | η a/ η b |
| Example 19 | 30 | 3500 | 70 | 2200 | — | — | 1.6 |
| Example 20 | 40 | 3500 | 60 | 2200 | — | — | 1.6 |
| Example 21 | 30 | 3500 | 70 | 3700 | — | — | 0.9 |
| Example 22 | 40 | 3500 | 60 | 3700 | — | — | 0.9 |
| Example 23 | 30 | 3500 | 70 | 5300 | — | — | 0.7 |
| Example 24 | 30 | 3500 | 70 | 2200 | Clay | 5 | 1.6 |
| Example 25 | 30 | 3500 | 70 | 2200 | Clay | 10 | 1.6 |
| Example 26 | 30 | 3500 | 70 | 2200 | Kaolin | 5 | 1.6 |
| Example 27 | 30 | 3500 | 70 | 2200 | Kaolin | 10 | 1.6 |
| Example 28 | 30 | 3500 | 70 | 2200 | Talc | 5 | 1.6 |
| Example 29 | 30 | 3500 | 70 | 2200 | Talc | 10 | 1.6 |
| Comparative Example 10 | 60 | 3500 | 40 | 2200 | — | — | 1.6 |
| Comparative Example 11 | 40 | 1400 | 60 | 3700 | — | — | 0.4 |

TABLE 6

| | Tensile Strength (kg/cm$^2$) | Flexural Modulus (kg/cm$^2$) | Izod Impact strength | TDUL (° C.) | Surface Smoothness | Lighting test |
|---|---|---|---|---|---|---|
| Example 19 | 780 | 25700 | >160 | 191 | good | no deformation |
| Example 20 | 770 | 25100 | >160 | 190 | good | no deformation |
| Example 21 | 790 | 25700 | >160 | 186 | good | no deformation |
| Example 22 | 760 | 25100 | >160 | 185 | good | no deformation |
| Example 23 | 800 | 25800 | >160 | 182 | good | no deformation |
| Example 24 | 770 | 31000 | >160 | 197 | good | no deformation |
| Example 25 | 770 | 35400 | 95 | 198 | good | no deformation |
| Example 26 | 780 | 30100 | >160 | 195 | good | no deformation |
| Example 27 | 790 | 34000 | 88 | 195 | good | no deformation |
| Example 28 | 780 | 31200 | >160 | 198 | good | no deformation |
| Example 29 | 790 | 35600 | 91 | 199 | good | no deformation |
| Comparative Example 10 | 760 | 25000 | >160 | 153 | silver | slight deformation |
| Comparative Example 11 | 770 | 26100 | >160 | 154 | good | slight deformation |

The reflectors molded from the composition of the comparative examples 10 and 11, show a slight deformation after lamp lighting test, and it is inconvenient in practical use. As the reflectors molded from the composition of examples 19–23, neither deformation nor discoloration was observed at all. The reflectors molded from the composition (examples 24–29) which contain clay, kaolin, talc, or titanium oxide in the thermoplastic resin composition comprising an aromatic polycarbonate resin and an aromatic polysulfone resin, neither deformation nor discoloration was observed at all.

Comparative Examples 12 and 13

A microwave oven test was conducted using an aromatic poly sulfone resin in which n=m and p=0 in the structure of the above-mentioned formula(II),(comparative example 12).

Moreover, a polyether imide resin (tradename ULTEM1000, manufactured by General Electric Company) and an aromatic polycarbonate resin (tradename CALIBRE, melt viscosity is 3500 poises at 340° C. under a shear rate of 1216/second, manufactured by Sumitomo Dow Limited) were mixed in the weight ratio of 70:30, pelletized, molded, and the lamp lighting test was conducted (comparative example 13).

As a result, the reflector molded from the composition of comparative examples 12 shows a deformation. The reflector molded from the composition of comparative example 13 also shows a slight deformation.

The thermoplastic resin composition and the molded article of the present invention are excellent in heat resistance and mechanical physical properties. They are very effective in the uses for parts, such as a car and an airplane, industrial instruments, household electric appliances products, tablewares and medical instruments, OA/AV instruments, electron/electronic parts, especially in the use for such as a lamp reflector, microwave oven parts, the IC tray, and an IC socket in which heat resistance is needed.

What is claimed is:

1. A thermoplastic resin composition comprising 15 to 55% by weight of an aromatic polycarbonate resin, and 85 to 45% by weight of an aromatic polysulfone resin having the repeating unit represented by the following formula in an amount of not less than 80 mol %:

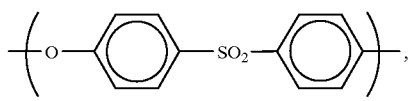

wherein the ratio ($\eta$a/$\eta$b) of the melt viscosity ($\eta$a) of the aromatic polycarbonate resin to the melt viscosity ($\eta$b) of the aromatic polysulfone resin defined below is 0.5 to 2.0;

wherein ($\eta$a) is the melt viscosity of the aromatic polycarbonate resin measured at a temperature of 340° C. and a shear rate of 1216/second; and wherein (ηb) is the melt viscosity of the aromatic polysulfone resin measured at a temperature of 340° C. and a shear rate of 1216/second.

2. The thermoplastic resin composition comprising 100 parts by weight of the thermoplastic resin composition of claim 1, and 1 to 10 parts by weight of titanium oxide having a number average particle diameter of 0.01 to 5 μm.

3. The thermoplastic resin composition comprising 100 parts by weight of the thermoplastic resin compositions of claim 1, and 1 to 80 parts by weight of a filler selected from the group consisting of clay, kaolin and talc.

4. The thermoplastic resin composition according to claim 1, 2 or 3, wherein the ratio (ηa/ηb) is 0.8 to 1.8.

5. The thermoplastic resin composition according to claim 1, 2 or 3, wherein the aromatic polycarbonate resin is a co-polycarbonate or a homo-polycarbonate containing at least 30 mol % of bisphenol A unit.

6. A molded article using the thermoplastic resin composition of claim 1, 2 or 3.

7. Microwave oven parts molded by using the thermoplastic resin composition of claim 1 or 2.

8. The microwave oven parts according to claim 7, wherein the parts are a saucer or a container for food cooking used in a microwave oven.

9. A lamp reflector comprising the thermoplastic resin composition of claim 1 or 3.

10. The lamp reflector according to claim 9, wherein the lamp reflector is a head lamp for cars, a reflector for fog lamps or a sub-reflector for head lamps.

11. The thermoplastic resin composition according to one of claims 1, 2 or 3, wherein the melt viscosity of the aromatic polysulfone resin used in the present invention measured at 340° C. and a shear rate of 1216/second, is 1000 to 6000 poise.

* * * * *